(12) United States Patent
Hepner et al.

(10) Patent No.: US 7,238,218 B2
(45) Date of Patent: Jul. 3, 2007

(54) MEMORY PREFETCH METHOD AND SYSTEM

(75) Inventors: David Frank Hepner, San Jose, CA (US); Andrew Moy, San Jose, CA (US); Andrew Dale Wall, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 10/818,601

(22) Filed: Apr. 6, 2004

(65) Prior Publication Data

US 2005/0223175 A1 Oct. 6, 2005

(51) Int. Cl.
G06F 12/00 (2006.01)

(52) U.S. Cl. .................. 71/137; 711/146; 711/204; 711/213

(58) Field of Classification Search ............. 711/137, 711/204, 213
See application file for complete search history.

(56) References Cited

U.S. PATENT DOCUMENTS

| 5,490,112 | A | 2/1996 | Hush et al. ............... 365/189.5 |
|---|---|---|---|
| 5,530,941 | A | 6/1996 | Weisser et al. ............. 395/478 |
| 5,974,497 | A | 10/1999 | Teshome .................... 710/129 |
| 6,075,929 | A | 6/2000 | MacLaren ................... 395/309 |
| 6,219,760 | B1 | 4/2001 | McMinn ...................... 711/137 |
| 6,286,074 | B1 * | 9/2001 | Batchelor et al. ........... 710/305 |
| 6,330,630 | B1 | 12/2001 | Bell ............................. 710/129 |
| 6,502,157 | B1 | 12/2002 | Batchelor et al. ........... 710/310 |
| 6,542,968 | B1 | 4/2003 | Spencer et al. ............. 711/137 |
| 6,728,840 | B1 * | 4/2004 | Shatil et al. ................ 711/137 |
| 2002/0144062 | A1 | 10/2002 | Nakamura ................... 711/137 |
| 2002/0199079 | A1 | 12/2002 | Gonzales et al. ........... 711/219 |
| 2003/0084274 | A1 | 5/2003 | Gaither et al. .............. 712/235 |
| 2003/0088740 | A1 | 5/2003 | Henry et al. ................ 711/137 |

FOREIGN PATENT DOCUMENTS

| JP | 8055025 A | 2/1996 |
|---|---|---|
| JP | 2001060169 | 3/2001 |

OTHER PUBLICATIONS

P.G. Emma, J.W. Knight, J.H. Pomerene, R.N. Rechtschaffen, and F.J. Sparacio, "Confirmed Prefetching With Confirmation On Exit", IBM Technical Disclosure Bulletin, vol. 29 (2), p. 911, (1986).

* cited by examiner

*Primary Examiner*—Reba I. Elmore
(74) *Attorney, Agent, or Firm*—Kunzler & McKenzie

(57) ABSTRACT

Prefetching data and instructions from a hierarchical memory based upon trajectories and patterns of prior memory fetches. Portions of the data are stored in a slower main memory and are transferred to faster intermediate memory between a requester and the slower main memory. The selected data items are retrieved from the slower main memory into a prefetch read buffer as an intermediate memory prior to any request from the requester for the particular selected and prefetched data. The address and size of the prefetched data is derived from the history, pattern, or trajectory of prior memory reads.

29 Claims, 4 Drawing Sheets

MEMORY PREFETCH METHOD AND SYSTEM

BACKGROUND

1. Technical Field

The invention relates to fetching data and instructions from a hierarchical memory where portions of the data are stored in a main memory and are transferred to faster intermediate memory between a requester and the slower main memory, and more particularly where the selected data items are retrieved from the slower main memory into a cache or buffer, that is, intermediate memory, prior to any request from the requester for the particular item of selected and prefetched data. A further aspect of the invention is an interface architecture that couples two or more buses to one another through a bridge including functions for controlling bridge operations and prefetching data.

2. Description of Related Art

It is frequently necessary to transfer large amounts of data across a data bus by a read action. Many times the protocol of the data bus or data channel limits the maximum size of the data chunk transferred to a size that is less than the amount of data needed by the requesting agent. Other latencies are introduced by, for example, the processes of requesting the data, locating the data, and making the data available for movement across the data bus or data channel, as well as fairness for servicing multiple data requests.

Input/output (I/O) processors typically read data from main memory in multiple byte blocks. Accessing these multiple byte blocks of data from memory is usually slower than the speed of the requester, causing the requester to wait for the data. This is the situation where there is a plurality of remote agents requesting data from the same memory through the same memory controller; the requests are intercepted by the memory controller, and sent by the memory controller to the memory as requests for packets of data. The requesting and packetization, as well as the queuing of the requests, packetization, and packets, introduce latency.

Beyond the speed of execution of individual steps in a memory operation (arising from, for example, device level issues), a significant component of latency is the number of memory fetches to get a data chunk from main memory to a data requester. For example, memory reads and fetches may occur through a Fibre Channel interface across a peripheral component interconnect (PCI) or peripheral component interconnect—extended (PCI-X) type bus.

The PCI system is an interconnection system between a microprocessor and attached devices in which expansion slots are spaced closely for high speed operation. A newer version of the PCI interconnect is the PCI-X interconnect. This is a computer bus technology (the "data pipes" between parts of a computer) that increases the speed that data can move within a computer from 66 megahertz (MHz) to 266 MHz, for example through a PCI—double data rate (PCI-DDR) connection. Specifically, PCI-X interfaces increase the performance for high bandwidth devices such as Gigabit Ethernet cards, Fibre Channel, Ultra3 Small Computer System Interface, and processors that are interconnected as a cluster.

Fibre Channel is a point-to-point, switched, and loop interface between servers and clustered storage devices, and, depending on the type, is faster than Small Computer System Interface (SCSI). It is designed to interoperate with SCSI, the Internet Protocol (IP) and other protocols. Standards for Fibre Channel are specified by the Fibre Channel Physical and Signaling standard, and the American National Standards Institute (ANSI) X3.230-1994, and International Standards Organization (ISO) 14165-1 standards.

The Fibre Channel adapter reads the main memory where an associated bridge serves the read request. A bridge is a hardware device that is used to connect different protocols or subsystems so that they can exchange data. Bridges can work with networks, devices, and subsystems that use different wiring or network protocols, joining two or more local area network (LAN) segments to from what appears to be a single network. Bridges are also used to connect I/O chassis to increase a computer's I/O capability.

The bridge acts like an initiator on one side (typically the SCSI side) and a target on the opposite side. The targets are selected by mapping the appropriate SCSI values into the target field and correlating a Fibre Channel logical unit number (LUN) value to a Bus:Target:LUN value. A LUN is a logical unit number that is a unique identifier used on a SCSI bus that enables it to differentiate between a plurality of separate devices (each of which is a logical unit). Each LUN is a unique number that identifies a specific logical unit, which may be an end user, a file, or an application program. The bridge hardware resides on a PCI or PCI-X card.

A critical latency issue arises because of bandwidth limitations in the PCI bus. This means that main memory has to be read inefficiently in many small chunks rather then efficiently in larger but fewer chunks. There are a lot of inefficient small reads of contiguous memory. And since memory may be serving multiple I/O adapters, it is important that it be used efficiently. That means that overall throughput will suffer if a read is done, but the data is not used.

Moreover, many software programs do not exhibit classical locality of reference behavior and/or the data sets they operate upon are larger than the cache size. As a result, cache misses increase and cache hits decrease. This illustrates one problem with traditional cache memories. Prior art cache memories are dependent on the temporal and spatial locality of data. As a result, the locality based cache memory paradigm often fails to work effectively in memory-access patterns that are lacking in conventional spatial or temporal locality. This, in turn, significantly reduces the performance of the requester. This problem is observed in large-scale scientific and technical computing where memory access is not strictly local but tends to be made in sequence to arrayed data with little data reused. This problem is also observed in many large business systems such as credit card processing or supply chain management, where memory requests are sequential.

One suggested solution is software prefetching. To reduce the cache "miss" rates, some computer systems utilize prefetch algorithms. When the requester reads data, the data associated with the successive addresses is also fetched and stored in cache. For example, if the requester request addresses A0–A7, addresses A8–A15 will also be fetched from memory. The prefetch algorithm increases the "hit" rate of the subsequent read request from the requester. Software prefetching has been used to transfer data from main memory to a cache memory in advance of a memory call. However, when list access is made to a data array, and in the case of programs written in an object-oriented language, the software frequently fails to properly insert the prefetch instruction. This is true even if the memory-access pattern is sequential.

Another alternative is hardware prefetch. Hardware prefetch includes one or both of: (i) making a hardware prefetch of a data stream which has already been prefetched once, or (ii) making a hardware prefetch if the difference between the address of the past memory access and the present memory access falls into a prescribed range.

In the case of a hardware prefetch of a data stream which has already been prefetched once, the hardware prefetch is ineffective for data streams which have yet to be prefetched. In the case of a hardware prefetch where the difference between the address of the past memory access and the present memory access falls into a prescribed range, the address of data to be prefetched is generated by adding the interval of the address to the present access address. However, this hardware prefetch often fails to eliminate the latency in data transfer from the main memory to the cache memory.

As described above, because instructions are scheduled in a requester with a built-in cache memory based on an assumption that the latency of the cache memory is short, processing performance falls significantly if a cache miss occurs. Cache misses often occurs in sequential memory-access patterns.

Thus, a clear need exists for an intelligent bus or bus bridge with memory and logic, where the intelligence eliminates the many small reads of contiguous memory, reading a bigger chunk of contiguous memory in a single read and storing the reads in cache memory associated with the intelligent bus or bridge as prefetched memory.

A still further need exists to reduce both the latency associated with slower device physics and more and slower process steps in the main memory, as well as latency associated with the additional process steps in accessing the main memory from the bridge.

A still further need exists for a method and an apparatus in the data bus or channel, for example, a bridge device or subsystem, to interact with the data bus or data channel, and at the source of the data, to prefetch the data and to make the prefetched data ready for transfer of data as a function of past requests for data.

SUMMARY

One aspect of the invention is a method, program product, and system for a data bus including a Memory Read Prefetch Device ("MRPD") having a memory read prefetch buffer. The method and system respond to a data request by a remote agent by prefetching memory across a bus to a remote agent in response to memory read calls from the remote agent, loading the memory read prefetch buffer with a data chunk including data beyond the data requested by the requester and transferring data from the memory read prefetch buffer in response to the remote agent read call if the actual data address of the memory to be read matches the address and size of data in the memory read prefetch buffer.

According to the method, system, and program product of the invention the data chunks extend beyond the data requested by the data requester and are prefetched through predictions of future requests for data as a function of past requests for data. The method, system, and program product described herein optimize data prefetches to reduce wasted reads and the associated latency.

Prefetching, including hardware prefetches, is useful in I/O subsystems. If a Fibre Channel adapter needs to read a large block of data, the bridge could read ahead even before the Fibre Channel adapter requests the data. This allows a very efficient use of the memory subsystem.

The method and system described herein utilizes a computer system including a central processing unit ("CPU"), and a requester, also referred to herein as a "remote agent" and, equivalently, a "remote agent data requester", a memory, and a bus, with a bus interface unit (bus bridge) including an MRPD having a memory read prefetch buffer, coupled between the requester and the memory to obtain data from the memory as well as to determine prefetch information from the memory and the history of the requester's data reads. Specifically, the pattern of prefetched data is determined as a function of historical patterns of previously fetched data by the requester, for example, a vector or trajectory of the previously fetched data. This pattern of previously fetched data is used to predict addresses of data to be prefetched in anticipation of future read requests.

According to the invention disclosed herein, the bus is an intelligent bus with memory and logic, including a MRPD. The MRPD associated with the bridge eliminates the many small reads of contiguous memory, reading a bigger data chunk from contiguous memory in a single read and storing it in the memory read prefetch buffer (referred to herin as as a cache or buffer memory) associated with the MPRD in the bridge as prefetched data. When this prefetched data is requested by the requester, it is served to the requester from the MPRD associated with the bridge, and not from main memory. This serves to reduce both kinds of latency, the latency associated with slower device physics and more and slower process steps in the main memory, as well as the latency associated with additional process steps in repeatedly accessing the main memory from the bridge and waiting for bus resources.

The memory read prefetch buffer bridge is not the cache in either the server or requester. It is an intermediate memory, that is, a buffer or cache associated with the bridge. The bridge, including the MRPD, incorporates its own processor, its own program memory, and its own buffer or cache (that is, the memory read prefetch buffer) and its own registers (to store addresses and sizes, as well as contiguity data) to affect prefetch. In this way, when a read request comes in from a requester, the bridge and MRPD try to send the requested data to the requester from the bridge and MRPD, and not from main memory.

The bus interface unit (bus bridge) receives a first read request for information. This information is associated with a first address of main memory. The bus interface unit (bus bridge) produces and places a request packet requesting the information and the prefetch information associated with the predicted addresses onto the bus to be read by main memory. The main memory provides the information and the prefetch information to the bus interface unit (bus bridge) including the MRPD. The information is transmitted to the requester and the prefetch information may be transmitted to the requester if actually subsequently requested by the requester, thereby reducing data latency and cache misses.

According to the method, system, and program product of our invention, prediction based prefetching of the data prior to it being requested by the running process on the requester saves time, reduces latency, reduces miss rates, and avoids contention with other activities that may exist on the memory bus. By this expedient of prefetching data based upon patterns, trajectories, vectors and histories of past requests for data, the data is available without delay when requested. This improves the utilization of the available bandwidth of the bus to the requesting device and reduces latency in servicing read requests.

According to the method, system, and program product described herein, the remote agent loads the MRPD buffers and registers with the address and size of data to be read. The MRPD reads the full size of data to the memory read prefetch buffer, that is, more data than the remote agent had requested, and depending on the architecture of the data bridge, the full size of data may be an entire packet of data or a sequence of packets of data, or the capacity of the data bridge buffer or an identified segment of the data bridge buffer The MRPD transfers this data from the memory read prefetch buffer across the bus, for example, in the size limits of the bus, to the remote agent. The transfer from buffer to the agent is done at each read request without delay.

In a preferred example, data is prefetched based upon the trajectory, pattern, vector, or history of prior reads in a method of prefetching data from a memory through a MRPD across a bus to a remote agent, that is, a requester. The method comprises loading a memory read prefetch buffer and register with an address and size of data to be subsequently read, where the address and size of the data are determined as a function of a projection from previous reads. If the data in the prefetch buffer matches the read request, the MRPD transfers the data from the memory read prefetch buffer to the requester in response to requester read requests.

One example of data prefetching based upon the trajectory, pattern, vector, or history of prior reads is a method of prefetching data from a memory through a MRPD across a bus to a remote agent, that is, a requester. The prefetch is in response to memory read calls from the remote agent, e.g., the requester. The MRPD monitors the bus for memory reads, and upon detecting a memory read, the MRPD determines if this read is the first read in a series of reads. If this read is the first read in a series of reads, the MRPD stores the address and size of the read in a register or registers.

If this read is not the first read in a series of reads, the MRPD compares the read to the previous read, e.g., for memory address and size. If a contiguous read is indicated, the MRPD sets a bit and writes the bit, that is, a "contiguity" bit, to a register.

The MRPD services the read request and also prefetches the next data chunk, that is, a second data request. The prefetched data chunk is stored in cache, and the address and size registers are set to the address and size of the prefetched data chunk in local cache.

The MRPD compares the address and size of the next read request to the address and size of the prefetched data stored in the prefetch address and size registers. If matched, the MRPD moves the data across data bus, leaves the prefetch bit at 1, and prefetches the next data chunk.

If, however, there is no match, the MRPD resets the prefetch bit to 0, clears the memory read prefetch buffer, sets the registers to the current read value's address and size, and services the read from main memory.

Another example of data prefetching, also based upon the trajectory, pattern, vector, or history of prior reads is a method of prefetching data from a memory through a Memory Read Prefetch Device (MRPD) across a bus to a remote agent, that is, a requester. The read and prefetch are in response to memory read calls from the remote agent, that is, the requester. In this alternative example, the Memory Read Prefetch Device monitors the data bus for memory reads and increments a counter for contiguous memory reads.

When the counter reaches a threshold value, the MRPD sets a bit in the contiguous memory read counter and prefetches a data chunk based upon the size and address of a last data chunk read. The prefetch is contiguous to last data chunk read. If the address and size of the next read matches the address and size of the data in cache, the data in cache is moved onto the bus. If, however, there is no match, the MRPD decrements the counter, stores the address and the size of the current read in the cache, and processes the read from main memory.

In an alternative of this example, the address and size of the data chunk are maintained in cache for comparison with a possible following match. If a subsequent read request yields a match the MRPD increments the counter for a match, and passes the data chunk on the bus for the following match.

DETAILED DESCRIPTION

The nature, objectives, and advantages of the invention will become more apparent to those skilled in the art after considering the following detailed description in connection with the accompanying drawings.

I. Hardware Components and Interconnections

One aspect of the invention is a data bridge including a Memory Read Prefetch Device. The data bridge and Memory Read Prefetch Device are to prefetch data from a memory across a bus to a remote agent in response to memory read calls from the remote agent. As an example, the memory read prefetch device's memory read prefetch buffer is loaded with a data chunk having a size greater than the requested data to be read; and data is transferred from the memory read prefetch buffer to the remote agent in response to a remote agent read call if the actual data address of the memory to be read matches the address and size of data in the memory read prefetch buffer.

Figure 1:
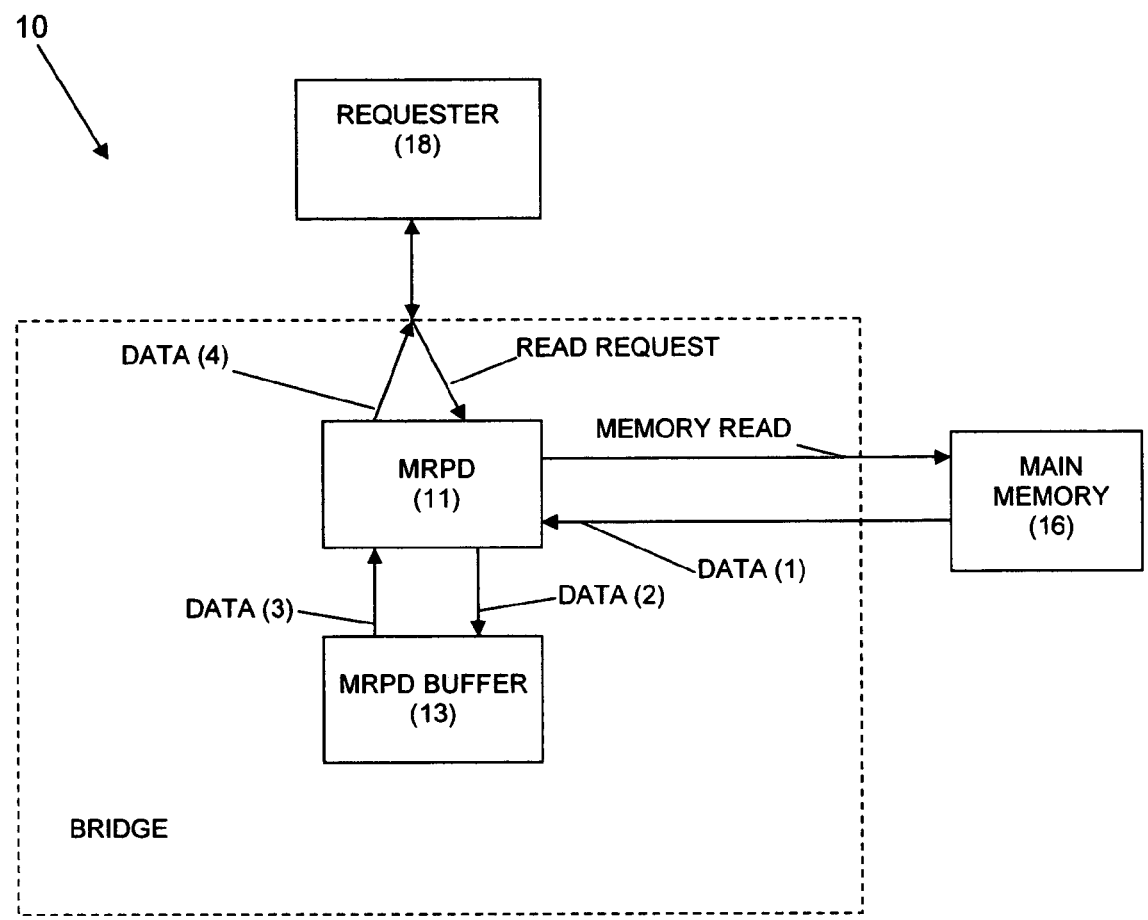
FIG. 1 is a high level overview of a data bridge between a data requester and a main memory. The data bridge servicing the requester is including a Memory Read Prefetch Device logic and a Memory Prefetch Device buffer.

FIG. 1 is a high level schematic overview of the data bridge for a computer system. The data bridge 10 is interposed between a data requester 18 and main memory 16 and includes the Memory Read Prefetch Device ("MRPD") 11 and its associated Memory Read Prefetch Device buffer 13. The term "buffer" as used with respect to the memory read prefetch buffer 13 encompasses buffers and cache memories, and these terms are used interchangeably herein.

The MRPD 11 may be a hardware implementation, a hardware implementation with embedded software and/or firmware, or software, such as an operating system function. The MRPD 11 includes various registers (not shown in the FIGURES). These registers are used for storing addresses and sizes of previously prefetched data, previously read data, data to be subsequently read, contiguity of reads, contiguity read counters, and prefetch bits. These registers may be processor hardware registers or registers in memory.

In operation the requester 18 requests data from main memory. The MRPD services this request by doing a Memory Read. The data returned, Data 1, is then sent to the requester, as Data 4. However, using the method and system disclosed herein, the MRPD 11 while sending the data, Data 4, to the requester 18 does another memory read of a larger size and sends the returned data, Data 2, to the MRPD buffer 13. When the next request comes in from the Requester 18, which request is within the memory range of, for example, Data 2, stored in MRPD buffer 13, it is serviced right away from the MRPD buffer 13 and sent, Data 3, to the Requester 18, as Data 4.

According to the method, system, and program product of our invention, memory read latency and memory bus contention are reduced, and cache hit rate is increased (cache miss rate is reduced) by data prefetch based upon patterns of previous read requests. Data prefetching, is based upon the trajectory, pattern, vector, or history of prior reads in a method of, system for, and program product for prefetching data from a memory through a MRPD 11 across a bus to a remote agent 18, that is, a requester 18.

The MRPD 11 is an entity that may be part of or used in conjunction with a data bridge 10 to exploit locality of memory within the context of memory hierarchy to enhance hit rate (reduce memory misses) and reduce latency. Normally, the data bridge 10 receives a fetch request from a requester 18, fetches the requested data from memory 16, and brings the fetched data, as Data 1, and Data 2, into a buffer 13 and sends the requested data, Data 3, and Data 4, to the requester 18. This process inherently has a high degree of latency.

As described herein, the MRPD 11 prefetches a data chunk, that is, a body of data. The size of the data, Data 1, may be greater then the actual fetch request. This data chunk or body of data is stored in a buffer memory 13 associated with the MRPD 11, thereby reducing the multiple latencies associated with a series of many individual fetches.

II. Operation

The MRPD 11 entity uses a previous history of memory fetches to determine the address of the data to be prefetched. If the next subsequent request or requests are within the prefetched chunk the latencies are substantially reduced. If, however, a subsequent request is not in the prefetched data chunk, the penalty is merely the normal latency associated with a normal memory read.

The prediction of memory fetches is based upon the history of memory fetches. In one embodiment the MRPD 11 analyzes a history of previous reads, as a trajectory of addresses or addresses and sizes of memory reads, Read Request, predicts the address and size of a next memory read request, for example by incrementing the address of the last memory read, and loads a memory read prefetch buffer and register with the address and size of the predicted data expected to be subsequently read. If the data in the prefetch buffer matches the read request, the MRPD transfers the data from the memory read prefetch read device buffer 13 to the requester in response to requester read requests.

In an alternative example, the MRPD 11 monitors the bus for memory reads, and upon detecting a memory read the MRPD 11 determines if this read is the first read in a series of reads. If this read is the first read in a series of reads, the MRPD 11 stores the address and size of the read in a register or registers.

In a still further example the MRPD 11 monitors the data bus for memory reads and increments a counter for contiguous memory reads. This is based on an assumption that as the number of contiguous memory reads increases, the likelihood that the next memory read will be contiguous also increases. When the counter reaches a threshold value, the MRPD 11 sets a bit in the contiguous memory read counter, and prefetches a data chunk based upon the size and address of a last data chunk read, for example incrementing the address of the last memory read. The resulting prefetch is contiguous to the last data chunk read. If the address and size of the next read matches the address and size of the data in cache the data in the cache is moved onto the bus. If, however, there is no match, the MRPD 11 decrements the counter, stores the address and the size of the current read in the cache, and processes the read from main memory.

The MRPD 11 may be implemented in software, as an operating system function, or in hardware, or in hardware with associated firmware. It is most commonly implemented as a component of an intelligent data bridge 10 with program memory, cache memory, and processing.

III. Overall Sequence of Operations

In one mode of operation the MRPD 11 stores the upper portion of previous memory reads, and prefetches a data chunk having the next address in the sequence. Alternatively, the size of the previous memory read may be used along with the size of the previous memory read to calculate the address of the prefetch.

Figure 2:
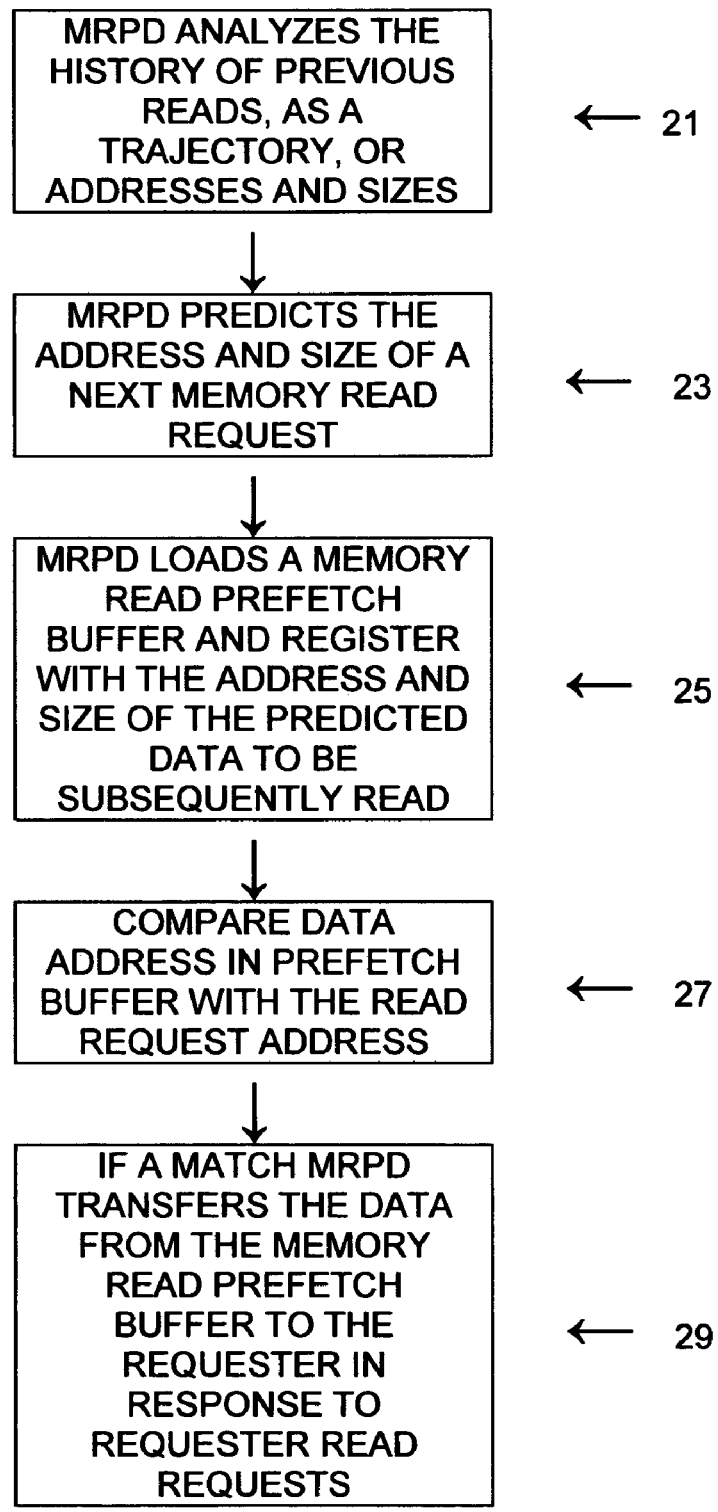
FIG. 2 is a flow chart of a process where the MRPD analyzes the history of previous reads according to an embodiment of the present invention.

At a high level, as shown in the flow chart of FIG. 2 and illustrated with the high level pseudo code below, the MRPD 11 analyzes the history of previous reads, as a trajectory, or vector of addresses and sizes 21, predicts the address and size of a next memory read request 23, and loads a memory read prefetch buffer and register with the address and size of the predicted data to be subsequently read 25. If the data in the prefetch buffer matches the read request 27, the MRPD transfers the data from the memory read prefetch buffer to the requester in response to requester read requests 29.

Figure 3:
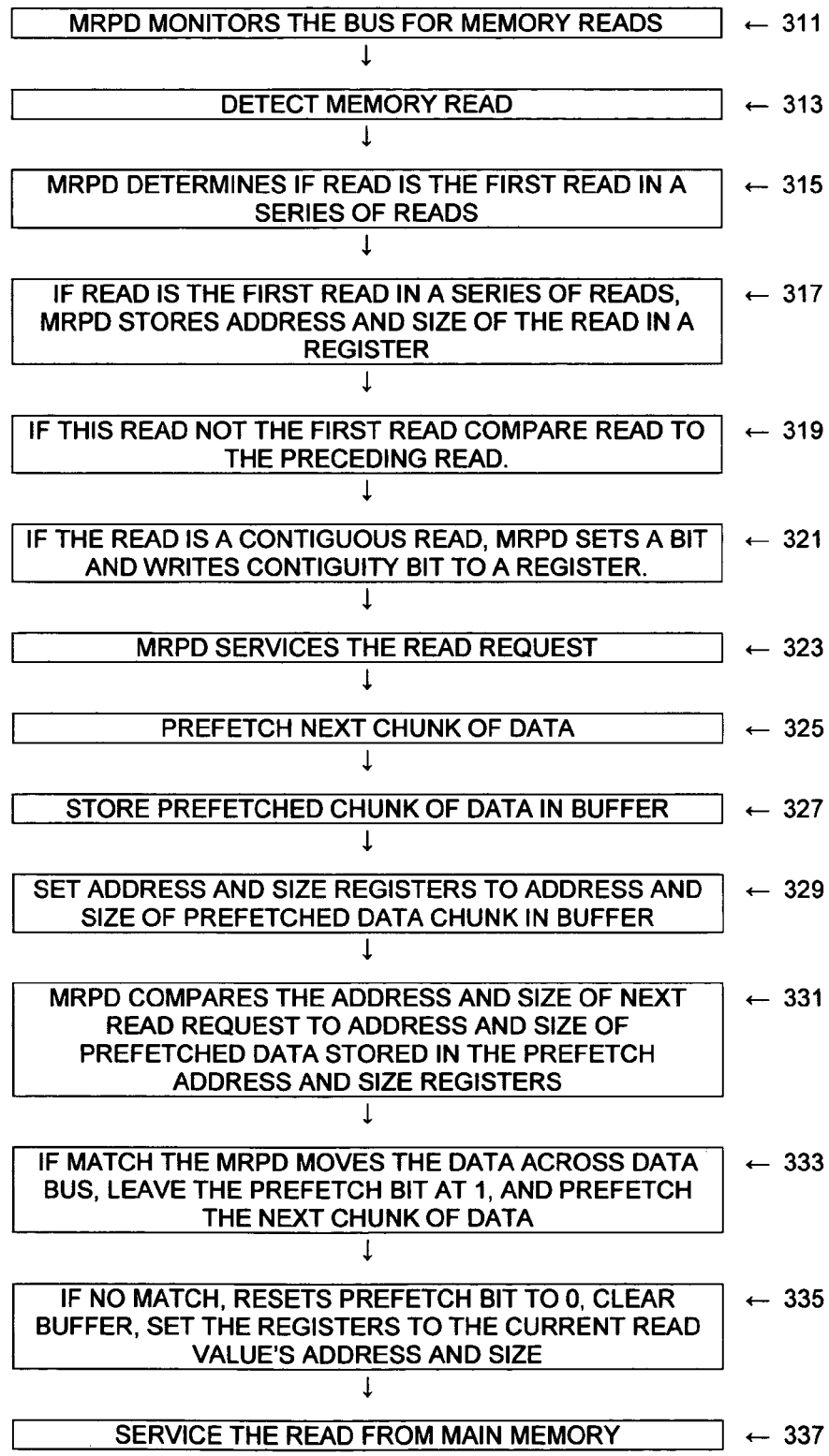
FIG. 3 illustrates a flow chart of a data prefetching process according to an embodiment of the present invention.

This has the pseudo code shown below.

analyze the history of previous data reads determine trajectory, of previous data read addresses and sizes predict the address and size of a next memory read request load memory read prefetch buffer and register with the address and size of the predicted data to be subsequently read if the data in prefetch buffer matches the read request transfer the data from memory read prefetch buffer to the requester else read data from main memory In an alternative example, having the flow chart shown in FIG. 3, data prefetching is also based upon the trajectory, pattern, vector, or history of prior reads in a method of prefetching data from a memory through a MRPD 11 across a bus to a remote agent, that is, a requester. The prefetch is in response to memory read calls from a remote agent, e.g., a requester 18. The MRPD 11 monitors the bus for memory reads 311 and upon detecting a memory read 313 the MRPD 11 determines if this read is the first read in a series of reads 315. If this read is the first read in a series of reads, the MRPD stores the address and size of the read in a register or registers 317.

If this read is not the first read in a series of reads, the MRPD 11 compares the read to the previous read, e.g., for memory address and size 319. If the read is a contiguous read, the MRPD sets a bit and writes the bit, that is, a "contiguity" bit, to a register 321.

The MRPD 11 services the read request, 323, and also prefetches the next data chunk 325. The prefetched data chunk is stored in cache 327, and the address and size registers are set to the address and size of the prefetched data chunk in local cache 329.

The MRPD 11 compares the address and size of the next read request to the address and size of the prefetched data stored in the prefetch address and size registers 331. If matched, the MRPD 11 moves the data across data bus, leaves the prefetch bit at 1, and prefetches the next data chunk 333.

If, however, there is no match, the MRPD 11 resets the prefetch bit to 0, clears cache, sets the registers to the current read value's address and size 335 and services the read from main memory 337.

This has the pseudo code shown below.
monitor data bus for memory reads
determine if a detected read is the first read in a series of reads
if this read is the first read in a series of reads store the address and size of the read
else compare the read to the previous read for memory address and size
  if contiguous read is indicated set and write a "contiguity" bit
  service the read request
  prefetch the next data chunk
  store prefetch data chunk in buffer
set the address and size registers to the address and size of the prefetched data chunk in buffer
compare the address and size of the next read request to the address and size of the prefetched data stored in the prefetch address and size registers
if match move data across data bus, leave the prefetch bit at 1, and
prefetch the next data chunk
else, reset the prefetch bit to 0, clear buffer, set the registers to the current read value's address and size, and service the read from main memory.

Figure 4:
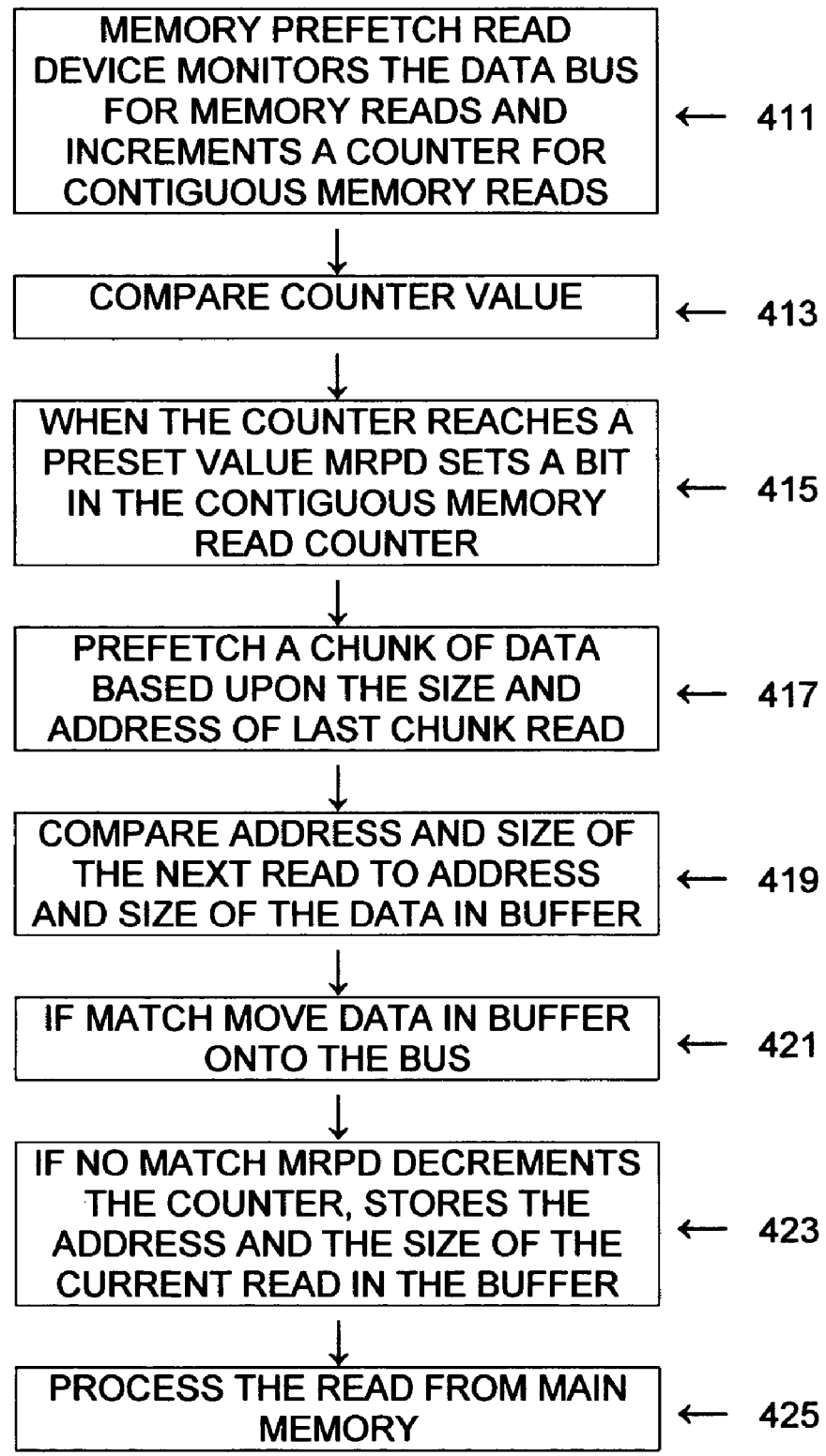
FIG. 4 illustrates a flow chart for a prefetch process according to an embodiment of the present invention.

In a still further example, having the flow chart shown in FIG. 4 and the pseudo code shown below, the Memory Read Prefetch Device 11 monitors the data bus for memory reads and increments a counter for contiguous memory reads 411. When the counter reaches a threshold value 413, the MRPD 11 sets a bit in the contiguous memory read counter 415 and prefetches a data chunk based upon the size and address of a last data chunk read 417. The prefetch is contiguous to last data chunk read. If the address and size of the next read matches the address and size of the data in cache, 419, the data in the cache is moved onto the bus 421. If, however, there is no match 423, the MRPD 11 decrements the counter, stores the address and the size of the current read in the cache, and processes the read from main memory 425.

In an alternative of this example, the address and size of the data chunk are maintained in cache for comparison with a possible following match. If a subsequent read request yields a match the MRPD 11 increments the counter for a match, and passes the data chunk on the bus for the following match.

This has the pseudo code:
monitor data bus for memory reads
increment a counter for contiguous memory reads
test counter for stored value of contiguous memory reads
if counter meets threshold value set a bit in the contiguous memory read counter and prefetch a data chunk based upon the size and address of a last data chunk read
if the address and size of next read matches the address and size of the data in cache move data in cache onto the bus
else decrement contiguous memory counter, store the address and size of the current read in cache
process the read from main memory IV. Program Product The invention may be implemented, for example, by having the MRPD 11 as a software application (as an operating system element), a dedicated processor, or a dedicated processor with dedicated code. The MRPD 11 executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for data prefetch.

This signal-bearing medium may comprise, for example, memory in a server. The memory in the server may be non-volatile storage, a data disc, or even memory on a vendor server for downloading to a processor or an MRPD 11 for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, LEPROM, flash memory, magneto-optical storage, paper punch cards, or any other tangible signal-bearing media. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

V. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method of prefetching data from a memory across a bus to a remote agent in response to memory read calls from the remote agent, comprising:
monitoring the bus for memory reads;
upon detecting a memory read, determining if the memory read is a first memory read, and if the memory read is a first memory read, storing the address of the memory read;
predicting an address of data to be read based upon previous memory reads;
loading a memory read prefetch buffer with data of the predicted address of data to be read;
if the memory read is not a first memory read, comparing the memory read to a previous memory read;
if the memory read is contiguous to a previous memory read, servicing the memory read, prefetching a second data chunk, storing the second data chunk in a memory read prefetch buffer;
comparing an address of a second read request to an address of the second data chunk; and if the comparison indicates a match then moving the second data chunk across the bus, leaving a prefetch bit at 1, and prefetching another data chunk.

2. The method of claim 1 further comprising predicting the address of data to be read based upon a trajectory of previous memory reads.

3. The method of claim 1 further comprising predicting the address of data to be read next as a next contiguous block of memory from a current memory read.

4. The method of claim 1 further comprising prefetching data from a memory through a Memory Read Prefetch Device (MRPD) across a bus.

5. The method of claim 1 further comprising:
comparing an address and size of the second read request to an address and size of the second data chunk; and
if the comparison indicates a match then moving the second data chunk across the bus, leaving a prefetch bit at 1, and prefetching another data chunk.

6. The method of claim 1 further comprising:
monitoring the bus for memory reads and incrementing a counter for contiguous memory reads;
when the counter reaches a threshold value, prefetching a data chunk based on an address of a last data chunk read;
if an address of a second read matches an address of the prefetched data chunk, then moving the prefetched data chunk onto the bus; and
if the address of the second read does not match the address of data in the memory read prefetch buffer, then decrementing the counter, and processing the second read from memory.

7. The method of claim 6 further comprising prefetching a data chunk contiguous to the last data chunk read.

8. The method of claim 6 wherein if there is no match maintaining the address of the prefetched data for comparison to a following match, incrementing the counter for a match, and passing the data chunk on the bus for a following match.

9. The method of claim 1 further comprising:
monitoring the bus for memory reads and incrementing a counter for contiguous memory reads;
when the counter reaches a threshold value, prefetching a data chunk based on an address and size of a last data chunk read;
if an address of a second read matches the address and size of the prefetched data chunk, then moving the prefetched data chunk onto the data bus; and
if the address and size of the next read does not match the address and size of the prefeteched data chunk, then decrementing the counter, and processing the second read from memory.

10. The method of claim 9 further comprising prefetching a data chunk contiguous to the last data chunk read.

11. The method of claim 9 wherein if there is no match maintaining the address of the prefetched data for comparison to a following match, incrementing the counter for a match, and passing the data chunk on the bus for a following match.

12. The method of claim 9 wherein if there is no match maintaining the address and size of the prefetched data for comparison to a following match, incrementing the counter for a match, and passing the data chunk on the bus for a following match.

13. A system including a remote agent data requester, memory, and a data bus connecting the remote agent data requester and the memory, adapted for prefetching data from the memory across the data bus to the remote agent data requester in response to memory read calls from the remote agent data requester, by performing operations, the operations comprising:
monitoring the data bus for memory reads;
upon detecting a memory read, determining if the memory read is a first memory read, and if the memory read is a first memory read, storing the address of the memory read;
predicting an address of data to be read based upon previous memory reads;
loading a memory read prefetch buffer with data of the predicted address of data be read;
if the memory read is not a first memory read, comparing the memory read to a previous memory read;
if the memory read is contiguous to a previous memory read, servicing the memory read, prefetching a next data chunk, and storing the prefetched data chunk in a memory read prefetch buffer;
comparing the address of the next read request to the address of the prefetched data chunk; if a match, moving the prefetched data across the data bus, leaving a prefetch bit at 1, and prefetching a next data chunk; and
if not a match, clearing the memory read prefetch buffer, setting registers to the current read value's address, and servicing the read from memory.

14. The system of claim 13 wherein the operations further comprise prefetching data from memory through a Memory Read Prefetch Device (MRPD) across the data bus.

15. The system of claim 13 wherein the operations further comprise:
monitoring the data bus for memory reads;
upon detecting a memory read, determining if the memory read is a first memory read, and if the memory read is a first memory read, storing the address and size of the memory read;
if the memory read is not a first memory read, comparing the memory read to a previous memory read;
if the memory read is contiguous to a previous memory read, servicing the memory read, prefetching a next data chunk, storing the prefetched data chunk in the memory read prefetch buffer, and setting address and size registers to the address and size of the data chunk in the memory read prefetch buffer;
comparing the address and size of next read request to the address and size of the prefetched data chunk in the address and size registers;
if a match, moving the prefetched data across data bus, leaving prefetch bit at 1, and prefetching a next data chunk; and
if not a match, clearing the memory read prefetch buffer, setting registers to the current read value's address and size, and servicing the read from memory.

16. The system of claim 13 wherein the operations further comprise predicting the address of data to be read based upon a trajectory of previous memory reads.

17. The system of claim 16 wherein the operations further comprise predicting the address of data to be next memory read as the next contiguous block of memory from the current memory read.

18. The system of claim 13 wherein the operations further comprise:
monitoring the bus for memory reads and incrementing a counter for contiguous memory reads;

when the counter reaches a threshold value, prefetching a
   data chunk based on an address of a last data chunk
   read;
if an address of a second read matches the address of data
   in the memory read prefetch buffer, moving prefetched
   data in the memory read prefetch buffer onto the data
   bus; and
if the address of the next read does not match the address
   of data in the memory read prefetch buffer, then decrementing the counter, storing the address of the current
   read, and processing the second read from memory.

19. The system of claim 18 wherein the operations further comprise:
   monitoring the bus for memory reads and incrementing a counter for contiguous memory reads;
   when counter reaches a threshold value, prefetching a data chunk based on the address and size of the last data chunk read;
   if the address of a second read matches the address and size of data in the memory read prefetch buffer, moving the prefetched data in the cache onto the data bus; and
   if the address and size of the next read does not match the address and size of the data in the memory read prefetch buffer, decrementing the counter, storing the address and size of the current read, and processing the second read from memory.

20. The system of claim 18 wherein the operations further comprise prefetching a data chunk contiguous to the last data chunk read.

21. The system of claim 18 wherein if there is no match maintaining the address of the prefetched data in cache for comparison to a following match, incrementing the counter for a match, and passing the data chunk on the bus for a following match.

22. A program product tangibly embodying a program of computer readable instructions executable by a digital processing apparatus to control a computer system having a remote agent data requester, a memory and a data bus between the remote agent data requester and the memory, said program product controlling the computer system to perform operations to prefetch data from the memory across the data bus to the remote agent data requester in response to memory read calls from the remote agent data requester, the operations comprising:
   monitoring the data bus for memory reads;
   upon detecting a memory read, determining if the memory read is a first memory read, and if the memory read is a first memory read, storing the address of the memory read;
   predicting an address and size of data to be read based upon a trajectory of previous memory reads;
   loading a memory read prefetch buffer with data of the predicted address of data be read;
   if the memory read is not a first memory read, comparing the memory read to a previous memory read;
   if the memory read is contiguous to a previous memory read, servicing the memory read, prefetching a second data chunk, storing the prefetched data chunk in cache, and setting the address register to the address of the data chunk in local cache;
   comparing the address of the second read request to the address of the prefetched data chunk in the address register; and
   if the comparison indicates a match, moving the prefetched data across data bus, leaving prefetch bit at 1, and prefetching another data chunk.

23. The program product of claim 22, wherein the operation of predicting the address and size of memory to be read further comprises predicting the address of data to be the next memory read as the next contiguous block of memory from the current memory read.

24. The program product of claim 22, wherein the operation of predicting the address and size of memory to be read further comprises prefetching data from a memory through a memory read prefetch device across a data bus.

25. The program product of claim 22, the wherein the operation of predicting the address and size of memory to be read further comprises:
   monitoring the data bus for memory reads;
   upon detecting a memory read, determining if the memory read is a first memory read, and if the memory read is a first memory read, storing the address of the memory read;
   if the memory read is not a first memory read, comparing the memory read to a previous memory read;
   if the memory read is contiguous to a previous memory read, servicing the memory read, prefetching a second data chunk, storing the prefetched data chunk in the memory read prefetch buffer, and setting the address and size registers to the address and size of the data chunk in local cache;
   comparing the address and size of next read request to the address and size of the prefetched data chunk in the address and size registers;
   if a match moving the prefetched data across data bus, leaving a prefetch bit at 1, and prefetching a next data chunk; and
   if not a match, clearing the memory read prefetch buffer, setting registers to the current read value's address and size, and servicing the read from memory.

26. The program product of claim 22, wherein the operation of predicting the address and size of memory to be read further comprises:
   monitoring the bus for memory reads and incrementing a counter for contiguous memory reads;
   when the counter reaches a threshold value, prefetching a data chunk based on the address of a last data chunk read;
   if the address of a second read matches the address of data in the memory read prefetch buffer, moving prefetched data onto the data bus; and
   if the address of the next read does not match the address of the prefetched data, decrementing the counter, storing the address of the current read, and processing the second read from memory.

27. The program product of claim 26, wherein the operation of predicting the address and size of memory to be read further comprises:
   monitoring the bus for memory reads and incrementing a counter for contiguous memory reads;
   when the counter reaches a threshold value, prefetching a data chunk based on the address and size of the last data chunk read;
   if address of the next read matches the address and size of the prefetched data chunk, moving the prefetched data onto the data bus; and
   if the address and size of the second read does not match the address and size of the prefetched data, decrementing the counter, storing the address and size of the current read, and processing the read from memory.

28. The program product of claim 26 wherein the operation of predicting the address and size of memory to be read further comprises prefetching a data chunk contiguous to the last data chunk read.

29. The program product of claim 26 wherein if there is no match, the operation of predicting the address and size of memory to be read further comprises maintaining the address of the prefetched data in cache for comparison to a following match, incrementing the counter for a match, and passing the data chunk on the bus for a following match.

* * * * *